(No Model.)
W. W. VALENTINE.
VEHICLE WHEEL.
No. 517,201. Patented Mar. 27, 1894.
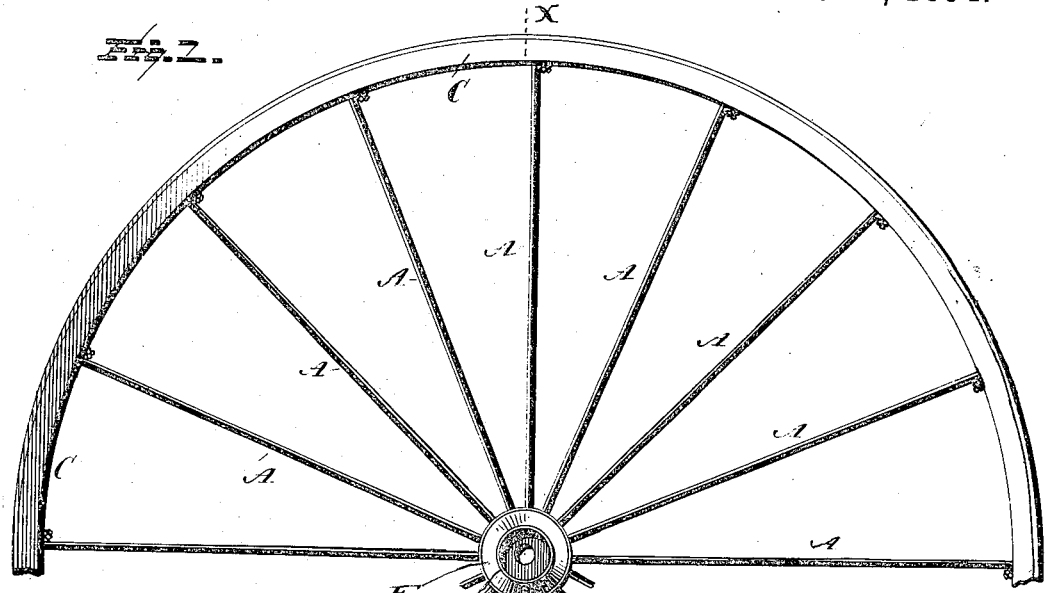
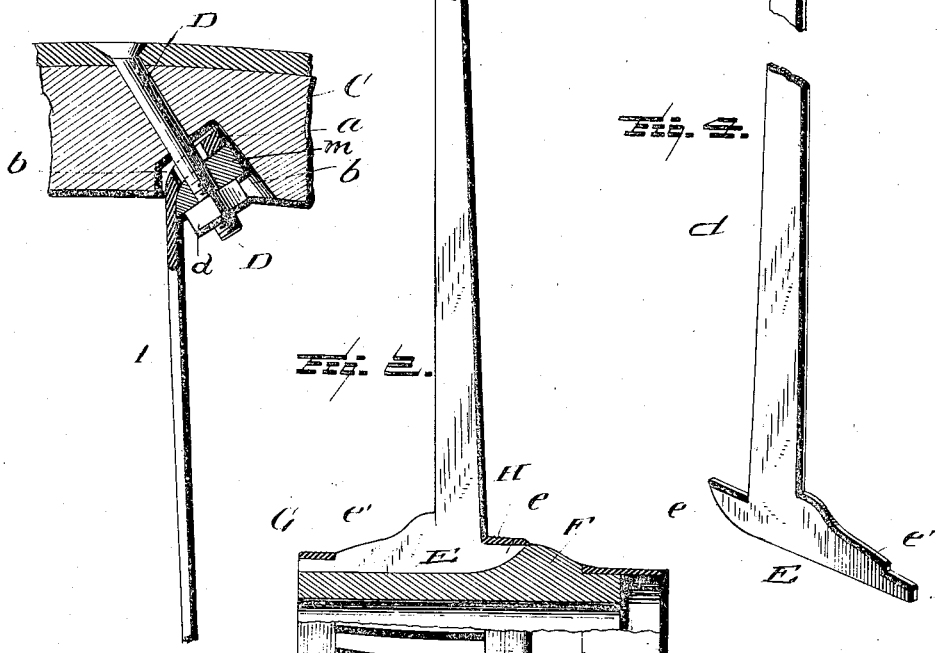
Witnesses:
L. C. Hills.
Van Buren Hillyard.
Inventor.
Waldo W. Valentine.
By R. S. & A. P. Lacey
Attorneys

UNITED STATES PATENT OFFICE.

WALDO W. VALENTINE, OF WASHINGTON, DISTRICT OF COLUMBIA.

VEHICLE-WHEEL.

SPECIFICATION forming part of Letters Patent No. 517,201, dated March 27, 1894.

Application filed June 15, 1893. Serial No. 477,686. (No model.)

*To all whom it may concern:*

Be it known that I, WALDO W. VALENTINE, a citizen of the United States, residing at Washington, in the District of Columbia, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels which are composed of metal spokes and hub and rim of wood or other elastic material.

The objects of the invention are to provide elastic seats for both extremities of metal spokes; to avoid rigidity at points of attachment which are most liable to injury by vibration; and to facilitate the removal of a spoke from a completed wheel and the replacement of same by another spoke when required, without disturbing other spokes or the tire.

The improvement consists of the novel features and the peculiar construction and combination of the parts which will be hereinafter more fully described and claimed and which are shown in the annexed drawings, in which—

Figure 1 is a side elevation of a wheel embodying my invention, the lower half being broken away. Fig. 2 is a cross section on the line X—X of Fig. 1 looking to the right, the lower portion of the hub being shown in full and the upper end of the spoke and the rim being broken away to economize space. Fig. 3 is a detail view of a portion of the rim showing the means for attaching the end of the spoke thereto. Fig. 4 is a detail perspective view of a spoke, an intermediate portion being broken away.

The general construction of the wheel is substantially the same as that shown in my previous Patent No. 475,906, bearing date May 31, 1892, on which the present invention is an improvement.

The metal spoke A is thin and wide and is set with its greatest width at right angles to the plane of the wheel. The outer end $a$ of the spoke is deflected to one side and is constructed to enter a recess $b$ in the inner side of the rim or felly C. One side of the recess $b$ is straight to receive the flat side of the spoke and the closed end preferably inclines toward the said inner straight side to receive the bent end $a$ of the spoke. It is obvious that this recess may be made radial or parallel to the direction of the spoke without departing from the spirit of the invention the object being close contact of the metal spoke with an elastic material, as wood. The cross head E at the inner end of the spoke is composed of two arms $e$ and $e'$ of unequal length. The arm $e$ is short and curved on its bearing edge on the arc of a circle whose center is somewhere within the length of the spoke and between the ends thereof. By this construction a spoke can be removed from the hub F by a lateral swing as will be readily understood.

The hub F is provided with a series of channels $f$ to form seats for the reception of the cross heads at the inner ends of the spokes. One end of these channels or seats $f$ is curved to correspond with the curved end or arm $e$ of the cross head and form a close joint therewith. The hub as well as the rim or felly is of wood or other elastic material.

In assembling the parts the cross heads of the spokes are forced into the seats $f$ and are held therein by bands G and H which are slipped on the ends of the hub and pressed over the arms $e$ and $e'$. The outer ends $a$ are inserted in the recesses $b$ and are held therein by the bolt D which passes obliquely through the rim. The outer ends $a$ of the spokes being apertured for the passage of the bolts may be made thicker than the main portion of the spokes to withstand the strain of the said bolts when tensioning the spokes. The aperture in the spokes for the tensioning bolt being oblong and somewhat larger than the bolt, will allow of vibratory motion of the spokes without distortion or crystallization of the metal. The aperture in the outer bent end of the spoke is oblong, so that the bolt does not fill it, and the bolt is set diagonal to the radial line, so that the strain upon it will be borne by the body of the bolt in part, and not come wholly upon the nut and thread. A slight motion is permitted by the oblong hole, thus relieving the bolt from abrasion, and the spoke from the effects of vibrations running to a rigid point. It will be observed that the bent end $a$ of the spoke may be gradually curved as shown in Fig. 3 or straight as shown in Fig. 4 as desired. The fastening bolt is provided with a washer $m$ which is mounted on the threaded end thereof between the bent end $a$ of the spoke and the nut $d$. The side of the washer designed to come against the bent end $a$ is shaped to conform thereto so as to bear firmly against the bent end $a$ and the angle formed between the bent angle and the main portion of the spoke, thereby bracing the said spoke at the point of flexion as most clearly shown in Fig. 3.

Having thus described my invention, what I claim, and desire to secure by Letters Patent, is—

1. In a wheel, a spoke having cross head at the inner end to obtain a purchase on the hub and brace the spoke laterally, and having one of the arms of the said cross head shorter than the other arm and curved on its bearing portion the center of curvature being within the length of the spoke, whereby ready detachment of the said spoke from the hub is effected by a lateral swing.

2. In a wheel, the combination of a tensioned spoke having a portion of its outer end bent laterally and apertured, a rim having a recess on the inner side to receive the bent end of the spoke and touch the edges of the same to prevent lateral motion of the spoke, and a tension bolt to secure the bent end of the spoke in the said recess in the rim, substantially as described.

3. In a wheel, a rim for vehicle wheels having oblique or a radial recess in the inner side, and having one side or wall of the said recess straight to receive the flat side of the spoke.

4. In a wheel having tensioned spokes, a tensioning bolt passing obliquely through tire and rim, and the end of the spoke, as and for the purpose described.

5. In a wheel, a hub and rim of wood or other elastic material, having recess with bottom and side walls, and metal spokes having both their ends seated in said recesses, and retaining and tensioning devices to hold the said ends against said elastic side or bottom walls, to prevent vibration injuriously affecting the said spokes, as set forth.

6. In a wheel having tensioned spokes the combined tire holding and tensioning bolts with elastic spoke seat and pliable joint between bolt and spokes, to annul the effect of vibration, as set forth.

In testimony whereof I affix my signature in presence of two witnesses.

WALDO W. VALENTINE.

Witnesses:
DAVID E. MOORE,
V. B. HILLYARD.